(12) United States Patent
Poder (10) Patent No.: US 7,690,694 B2
(45) Date of Patent: Apr. 6, 2010

(54) QUICK COUPLING DEVICE

(75) Inventor: Philippe Poder, Guichen (FR)

(73) Assignee: Legris SAS, Rennes (FR)

( * ) Notice: Subject to any disclaimer, the term of this patent is extended or adjusted under 35 U.S.C. 154(b) by 827 days.

(21) Appl. No.: 10/582,350

(22) PCT Filed: Nov. 23, 2004

(86) PCT No.: PCT/FR2004/002982

§ 371 (c)(1),
(2), (4) Date: Jun. 9, 2006

(87) PCT Pub. No.: WO2005/066534

PCT Pub. Date: Jul. 21, 2005

(65) Prior Publication Data

US 2007/0120362 A1    May 31, 2007

(30) Foreign Application Priority Data

Dec. 10, 2003   (FR)   .................................... 03 14458

(51) Int. Cl.
*F16L 37/18*   (2006.01)
(52) U.S. Cl. ........................ 285/314; 285/308; 285/315; 285/319; 285/921
(58) Field of Classification Search ................. 285/305, 285/308, 314, 315, 319, 322, 921, 18, 33
See application file for complete search history.

(56) References Cited

U.S. PATENT DOCUMENTS

| | | | |
|---|---|---|---|
| 753,096 A * | 2/1904 | Osteen | 285/283 |
| 888,326 A * | 5/1908 | Guth | 285/111 |
| 3,724,882 A * | 4/1973 | Dehar | 285/243 |
| 4,035,005 A * | 7/1977 | DeVincent et al. | 285/319 |
| 4,778,203 A * | 10/1988 | Bartholomew | 285/111 |
| 5,029,904 A | 7/1991 | Hunt et al. | |
| 5,226,680 A | 7/1993 | Bahner et al. | |
| 5,228,729 A * | 7/1993 | McElroy et al. | 285/319 |
| 6,340,180 B1 * | 1/2002 | Wisniewski | 285/319 |

FOREIGN PATENT DOCUMENTS

| | | |
|---|---|---|
| DE | 182 231 | 2/1905 |
| FR | 1 237 982 | 8/1960 |

\* cited by examiner

*Primary Examiner*—Aaron M Dunwoody
*Assistant Examiner*—Fannie Kee
(74) *Attorney, Agent, or Firm*—Young & Thompson (57) ABSTRACT

A quick coupling device comprising a body (5) axially subdivided into a link section (6) for linking to a first duct (1), and a connection section (7) arranged to receive in leaktight manner one end of a second duct (2), the body being associated with a retaining member (22) possessing tabs (24) that are elastically deformable between a state of gripping an outer bead (4) on the end of the second duct, and a state of releasing the bead, the retaining member being mounted on the body to turn between a free deformation position in which the tabs can deform between their two states, and at least one holding position in which the tabs cooperate with a surface (20, 21) that is secured to the body and that holds the tabs in one of their two states.

15 Claims, 6 Drawing Sheets

FIG_7

FIG_8

FIG.9

QUICK COUPLING DEVICE

BACKGROUND OF THE INVENTION

1. Field of the Invention

The present invention relates to a quick coupling device suitable for use, for example, in a circuit for transporting a fluid, such as air.

2. Description of the Related Art

There exist quick coupling devices comprising a body that is axially subdivided into a link section for linking to a first duct and a connection section arranged to receive in leaktight manner one end of a second duct. The body is associated with a retaining member possessing tabs that are elastically deformable between a state for gripping an outer bead on the end of the second duct, and a state for releasing the bead. The tabs are made integrally with the body. It is known to mount a locking ring on the body, which ring can pivot or slide between a position in which the ring leaves the tabs free to deform between their two states, and a position in which the ring holds the tabs in their gripping state.

In order to enable the tabs to deform, it is necessary for the body to be made of a material that is relatively elastic. The body, which is the main part of the coupling device, is then liable to suffer deformations that can spoil the quality of the coupling, in particular concerning the firmness with which the second duct is retained and the leaktightness of the coupling. Selecting the material to constitute the body thus constitutes making a difficult compromise between the rigidity needed for this structural part and its resilience which must be sufficient to enable the connection force to be moderate.

SUMMARY OF THE INVENTION

It would thus be advantageous to have a quick coupling device presenting performance that is improved compared with prior art coupling devices.

To this end, the invention provides a quick coupling device comprising a body axially subdivided into a link section for linking to a first duct, and a connection section arranged to receive in leaktight manner one end of a second duct, the body being associated with a retaining member possessing tabs that are elastically deformable between a state of gripping an outer bead on the end of the second duct, and a state of releasing the bead, the retaining member being mounted on the body to turn between a free deformation position in which the tabs can deform between their two states, and at least one holding position in which the tabs cooperate with a surface that is secured to the body and that holds the tabs in one of their two states.

Thus, the body can be made of a rigid material while the retaining member can be made of a material that is more elastic. This structure is also particularly simple to make.

In a first embodiment, in the holding position, each tab is in its gripping state and is received at least in part in a housing of the body having a surface that opposes deformation of the tab towards its release state.

The turning of the retaining member on the body then serves to lock retention of the second duct by holding the tabs in their gripping state. The locking of the connection can be checked visually by verifying that the tabs have been retracted into their housings.

In a second embodiment, in the holding position, each tab cooperates with a ramp of the body, lifting the tab so as to bring it into its release state.

Thus, when the retaining member is brought into its holding position, the body provides assistance for disconnection by bringing the tabs into their release state. Disconnection then does not require any special tooling.

It is then preferable, in the free deformation position, for the retaining member to be arranged to be capable of being driven axially by the second duct towards a locking position in which each tab in its gripping state is received at least in part in a housing of the body having a surface that opposes deformation of the tab towards its release state.

When the circuit in which the coupling device is implanted is itself put under pressure, the second duct reverses and entrains the retaining member into the locking position. The coupling is thus locked automatically when the circuit is put under pressure.

In a third embodiment, combining the two preceding embodiments, the retaining member possesses two holding positions that are angularly offset relative to each other, and preferably on either side of the free deformation position.

The retaining member can then be taken from the free deformation position either to its position for locking the connection, or to its disconnection position.

Advantageously, the body has a radial abutment surface for cooperating with a front radial surface at the free end of each tab when the tabs are subjected to a traction force.

Thus, the traction force which is exerted on the tabs is taken up by the body so that the force is distributed, thus making it possible to limit fatigue stressing, and the tabs are caused to work essentially in shear.

Also advantageously, the device includes indexing means for indexing the retaining member relative to the body at least for the free deformation position of the retaining member and, preferably, the indexing means comprises at least one flexible blade extending axially from the retaining member or the body to cooperate with a stud projecting radially from the body or from the retaining member.

Other characteristics and advantages of the invention appear on reading the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

With reference to FIGS. 1 to 6, the quick coupling device constituting a first embodiment of the invention is for enabling a first duct 1 (visible only in FIG. 1) to be connected to a second duct 2. The duct 2 has an end 3 provided on the outside with an annular bead 4. By way of example, the ducts 1 and 2 are pipes in a circuit for transporting a fluid, such as air, or they are secured one to a member for issuing fluid, such as a pump, and the other to a member for receiving fluid, such as a tank or a turbine. In this case, the ducts 1 and 2 are ducts of thermoplastic material.

The quick coupling device comprises a body given overall reference 5 which is subdivided into a link section 6 for linking to the duct 1, and into a connection section 7 arranged to receive the end 3 of the duct 2.

Figure 5:
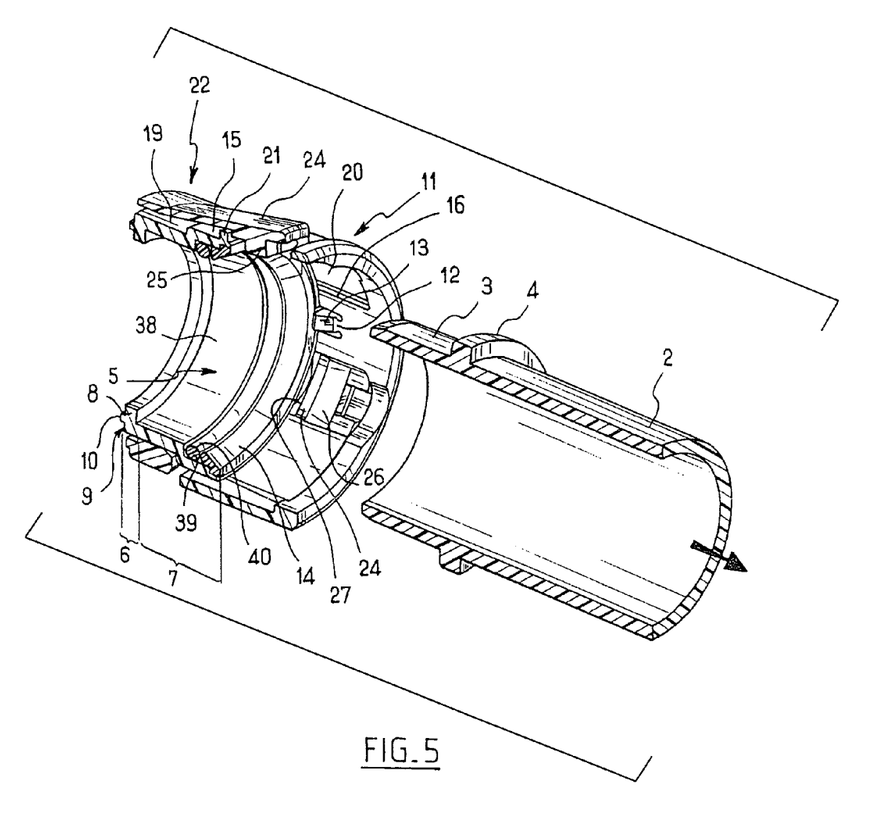
FIG. 5 is a perspective view in longitudinal section on plane V of FIG. 4.
Figure 6:
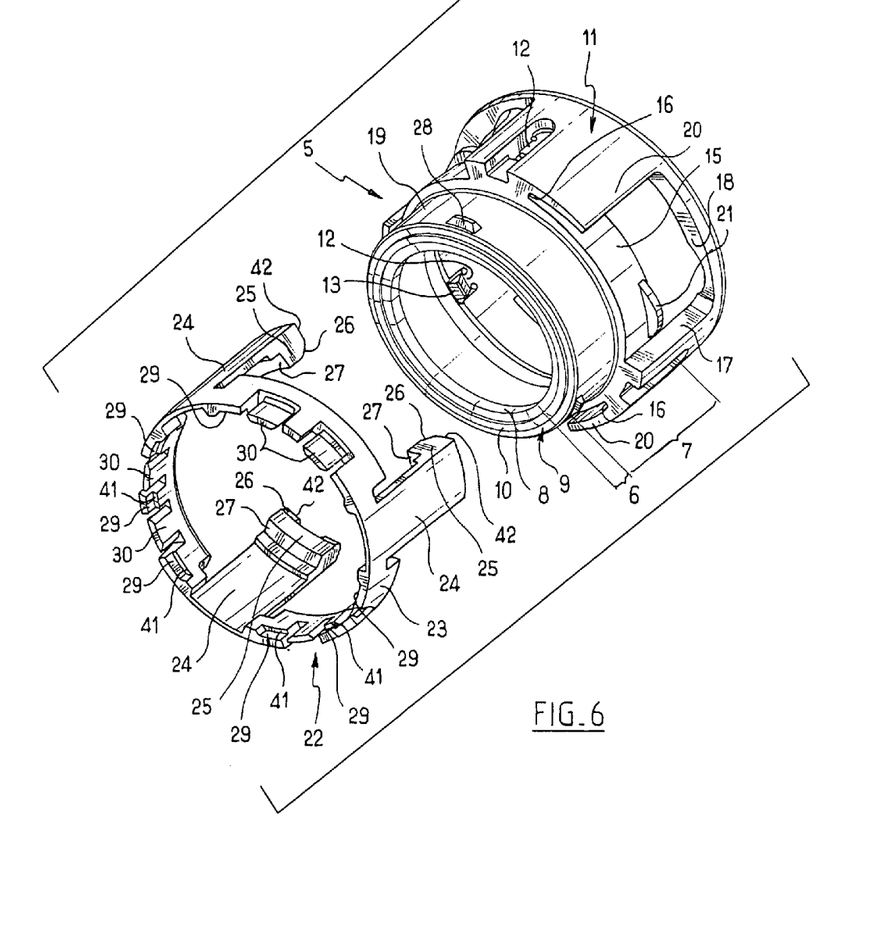
FIG. 6 is a fragmentary and exploded perspective view of the coupling device in accordance with the first embodiment.

In this example, the link section 6 comprises a ring 8 that presents, remote from the connection section 7, an end face 9 having a collar 10 extending in axial projection therefrom (visible in particular in FIGS. 5 and 6). In this embodiment, the link section 6 is for friction welding to the front face of the duct 1 (welding being performed by melting the collar 10). The link section 6 could equally well be secured to the end of the duct 1 by any other thermal or ultrasound welding technique, or even by adhesive. The link section 6 may also include a male end piece for insertion into the duct 1 or a female portion that is to receive the end of the duct 1 and that is provided with means for holding the duct 1 to the body 5 in a manner that is leaktight and that is permanent or separable.

The connection section 7 has a cylindrical housing 38 of diameter slightly greater than the outside diameter of the end 3 of the duct 2 in order to guide it. Remote from the link section 6, the housing 38 possesses an end in which there is formed a countersink 39 for receiving a sealing gasket 40 of annular shape having an inside diameter smaller than the outside diameter of the end 3 of the duct 2. The sealing gasket 40 is held in position in the countersink 39 by means of an annular insert 14 engaged in the countersink 39 via its end remote from the housing 38.

The connection section 7 is surmounted by a rim given overall reference 11, which extends beyond the connection section 7 away from the link section 6. The rim 11 is made integrally with the connection section 7 and possesses an inside diameter for its portion projecting from the connection 7 that is greater than the outside diameter of the annular bead 4 on the end 3 of the duct 2.

The rim 11 has tongues 12 defined therein, the tongues extending axially and each possessing a free end provided with a catch 13 (visible in FIGS. 5 and 6) projecting towards the inside of the rim 11. Beside the free end of the rim 11, the catch 13 possesses an inclined facet, and on its opposite side it possesses a radial facet. The tongues 12 are elastically deformable between a rest state in which the catches 13 project towards the inside of the rim 11, and a deformed state in which the catches 13 are retracted. The tongues 12 serve to hold the annular insert 14 in the countersink 39. While the annular insert 14 is being inserted into the rim 11, the annular insert 14 slides over the inclined facets of the catches 13 and thus brings the tongues 12 progressively into their deformed state. Once the annular insert 14 is in the countersink 39, the annular insert 14 is no longer in contact with the catches 13, such that the tongues 12 return elastically to their rest state in which the radial facets of the catches 13 together form an abutment for the annular insert 14 (see FIG. 5).

Setbacks 15 are formed in the outside of the rim 11 at 120° intervals from one another. These setbacks 15 are defined by pairs of lateral edges 16, 17 extending parallel to the axis of the coupling device, and by a transverse edge 18 extending perpendicularly to the axis of the coupling device beside the free end of the rim 11. Each setback 15 opens out remote from the transverse edge 18 to a cylindrical bearing surface 19 (visible in FIGS. 5 and 6) that is described in greater detail below.

A flap 20 extends from the lateral edge 16 and the transverse edge 18 to overlie one-third of the setback 15. In the vicinity of the lateral edge 17 of each setback 15, there extends a ramp 21 in a circumferential direction relative to the body 5 and projecting radially outwards into the setback 15.

The coupling device includes a retaining member, given overall reference 22 that comprises a sleeve 23 with one end from which extend axially-projecting tabs 24, each having a free end provided with an inwardly-projecting catch 25. Each catch 25 includes a chamfered surface 26 facing away from the sleeve 23 and a radial surface 27 beside the sleeve. The tabs 24 are elastically deformable between a gripping state in which the catches 25 define a through section of diameter smaller than the outside diameter of the annular bead 4 on the end 3 of the ducts 2, and a relief state in which catches 25 are spaced apart from one another so as to define a through section of diameter that is not less than the outside diameter of the annular bead 4.

The sleeve 23 is engaged on the cylindrical bearing surface 19 in such a manner that each tab 24 penetrates into a setback 15 through the open side thereof. In this embodiment, the tabs 24 are of a width that is equal to about one-third of the width of the setbacks 15.

The sleeve 23 is mounted to pivot on the cylindrical bearing surface 19 between three angular positions of the retaining member 22.

In a first extreme position or locking position (FIG. 3), each tab 24 is in its gripping state and extends in the vicinity of a corresponding lateral edge 16 in such a manner that the flap 20 covers the tab 24 at least in part and holds the tab 24 in its gripping state. It should be observed that by making the tabs to have a color or a shade that is different from that of the body makes it possible to check visually that locking has indeed taken place.

In a second extreme position or unlocking position (FIG. 4), each tab 24 is raised by the ramp 21 which holds the tap 24 in its release state.

In an intermediate position between these two extreme positions, referred as the quick connection position (FIG. 1), each tab 24 is disengaged from the corresponding flap 20 and the ramp 21 so as to be free to deform between its two states.

The coupling device further includes indexing means for indexing the retaining member in each of its three positions. The indexing means comprises three studs 28 extending at 120° to one another and projecting from the cylindrical bearing surface 19, while the sleeve 23 includes, beside its end remote from the tabs 24, three internal housings 29 each subdivided into three compartments by two spring blades 30 cut out axially from the sleeve so as to be spaced apart from one another. When the stud 28 passes from one internal housing compartment 29 to an adjacent compartment, the spring blade 30 extending between those compartments needs to deform. The spring blades 30 serve to hold the stud 28 in the compartment in which it is received, but they present chamfered edges forming cams for retracting the spring blades so as to allow the stud to pass from one compartment to another by passing through a hard point in turning the sleeve. The stud 28 also serves to hold the sleeve 23 axially on the cylindrical bearing surface 19. The internal housings 29 present radial shoulder surfaces 41 which cooperate with the studs 28 to oppose removal of the retaining member 22 by snap fastening it to the body.

In order to make a connection, the duct 2 is inserted into the quick coupling device while the retaining member 22 is in its quick connection position. During insertion of the duct 2, the annular bead 4 leaves the chamfered surface 26 which slides over the annular bead 4 thereby deforming the tabs 24 away from their gripping state towards their release state. Once the annular bead 4 has passed through, the tabs 24 return to their gripping state and the radial faces 27 oppose any extraction movement of the duct 2 from the coupling device.

Figure 1:
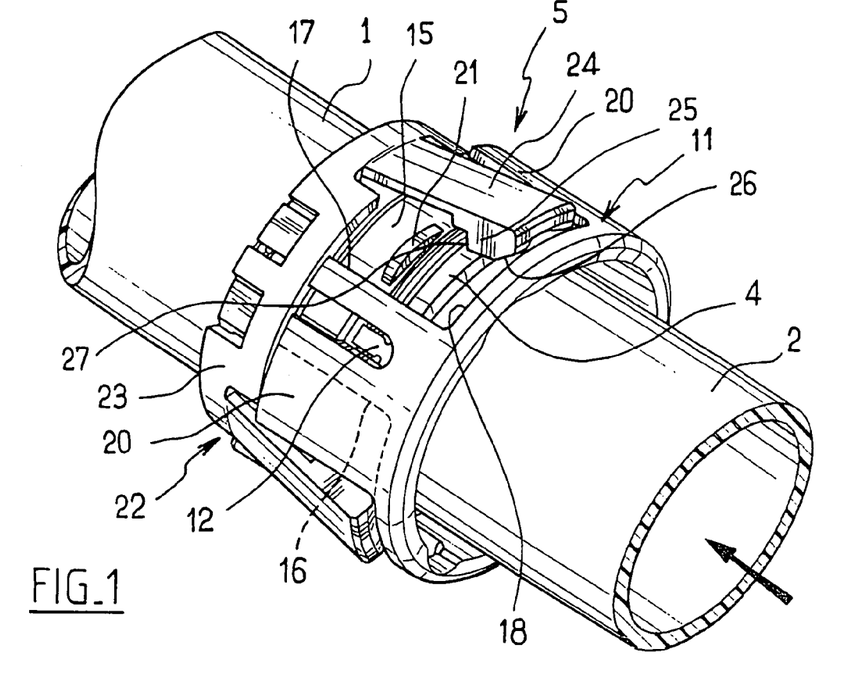
FIGS. 1 to 3 are perspective views showing the quick connection stage and the connection-locking stage for a duct in a coupling device constituting a first embodiment of the invention.
Figure 2:
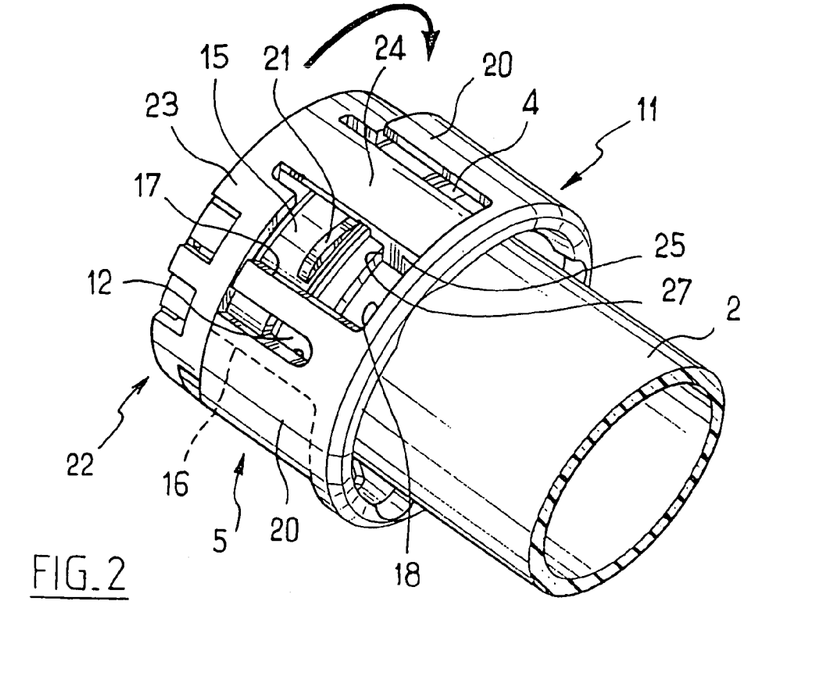

In order to lock the connection, the retaining member is turned so as to bring the tabs 24 under the flaps 20 so that the flaps oppose any deformation of the tabs 24 towards their release state (see FIG. 2). The retaining member is then in its locked position (see FIG. 3).

Figure 3:
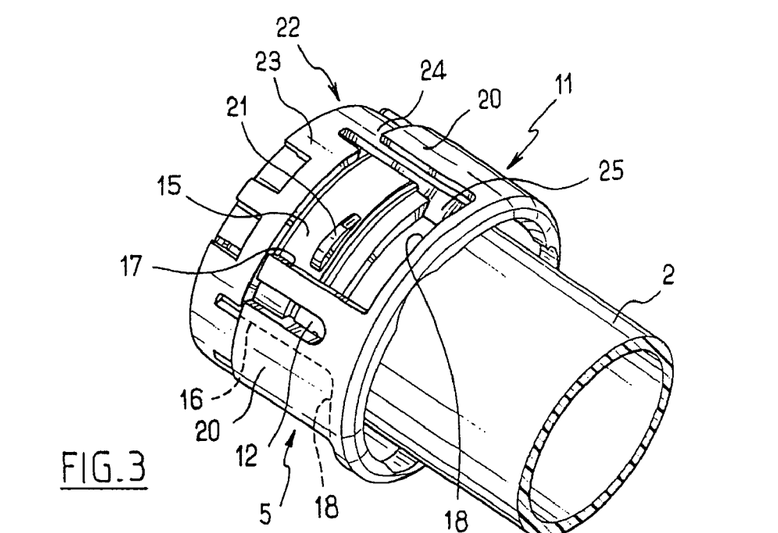

It should be observed that in this position, the tabs 24 possess respective radially-extending front faces 42 adjacent the transverse edges 18 such that any traction force exerted on the tabs 24 by the duct 2 puts the front faces 42 into contact with the transverse edges 18 that take up the traction force.

Figure 4:
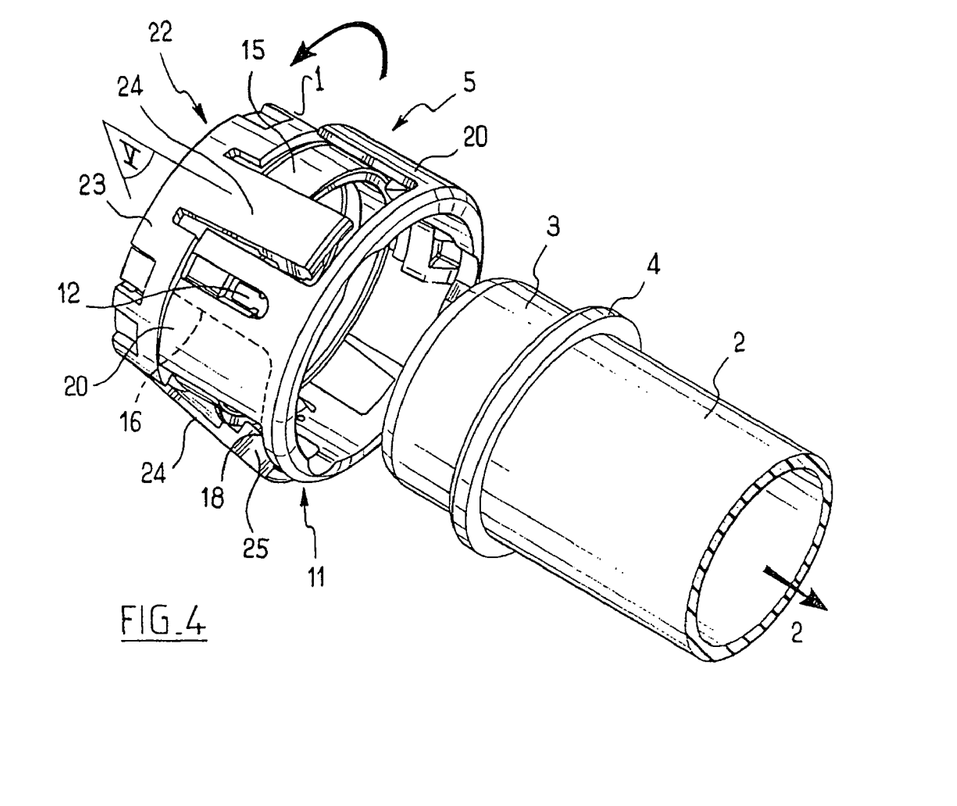
FIG. 4 is a view analogous to FIG. 1 showing the duct being disconnected.

Disconnection is achieved by turning the retaining member 22 towards its unlocking position (see FIG. 4 and FIG. 5). While turning in this way, the tabs 24 slide over the ramps 21 which lift the tabs 24, deforming them into their release state. The duct 2 can then be extracted from the coupling device.

Figure 7:
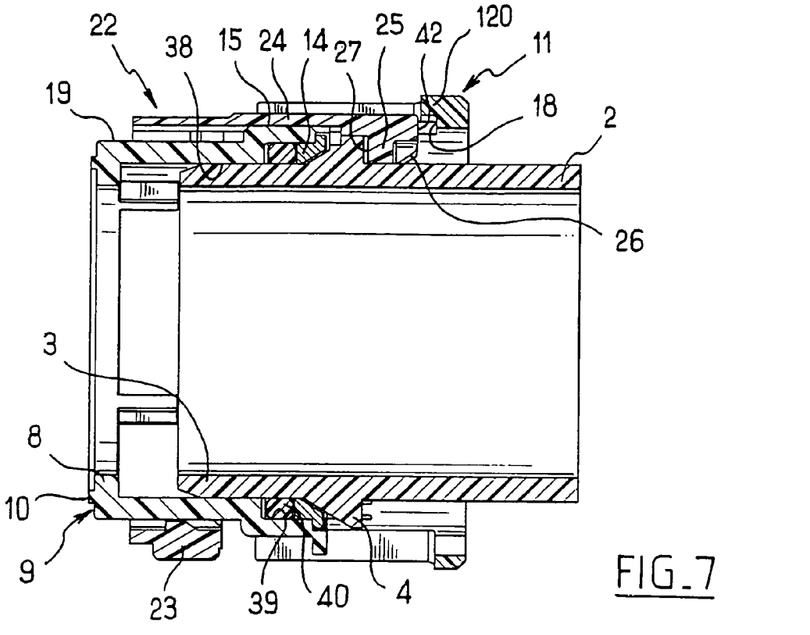
FIG. 7 is a longitudinal section view of a coupling device in accordance with a second embodiment of the invention, with a duct coupled thereto.

Elements that are identical or analogous to those described above are given identical numerical references in the following description of the second embodiment, which is described with reference to FIGS. 7 to 9.

The coupling device in accordance with the second embodiment comprises a body 5 and a retaining member 22.

The body 5, as in the first embodiment, comprises a link section 6 and a connection section 7.

The connection section 7 is surmounted by a rim 11 having setbacks 15 formed therein, each defined by two lateral edges 16, 17 extending parallel to the axis of the coupling device, and by a transverse edge 18 extending perpendicularly to the axis of the coupling device towards the free end of the rim 11. Each setback opens out away from the transverse edge 18 to a cylindrical bearing surface 19.

A flap 120 extends over the setback 15 from the lateral edge 16 and the transverse edge 18.

In the vicinity of the lateral edge 16 of each setback 15, a ramp 21 extends in a circumferential direction of the body 5, projecting radially outwards into the setback 15.

As in the first embodiment, the retaining member 22 comprises a sleeve 23 and tabs 24.

In this embodiment, the sleeve 23 is mounted on the cylindrical bearing surface 19 to turn between two angular positions of the retaining member 22.

In a first position referred to as a first extreme position (FIG. 7), the tab 24 extends in the vicinity of the lateral edge 16, while being separated from the flap 120 so as to be free to deform between its two states.

In a second extreme position or unlocking position, each tab 24 is raised by the corresponding ramp 21 that holds the tab 24 in its release state.

The indexing of the retaining member in its two positions is performed in a manner analogous to that of the first embodiment by means of studs 28 projecting from the cylindrical bearing surface 19 to be received in internal housings 29 in the sleeve 23. Each of the housings 29 in this example is subdivided into only two compartments by a single spring blade 30.

The sleeve 23 is also mounted on the cylindrical bearing surface 19 so as to slide axially from its position in which it can deform freely towards a locking position (FIG. 8) in which each tab 24 is in its gripping state and has its free end extending under the flap 120 which holds the tab 24 in its gripping state.

The connection is made by inserting the duct 2 into the quick coupling device while the retaining member 22 is in its quick connection position. The annular bead 4 encounters the chamfered surface 26 and causes the tabs 24 to deform from their gripping state to their release state. Once the annular bead 4 has been passed over, the tabs 24 return to their gripping state, and the radial face 27 opposes any extraction movements of the duct 2 out from the coupling device (see FIG. 7).

Figure 8:
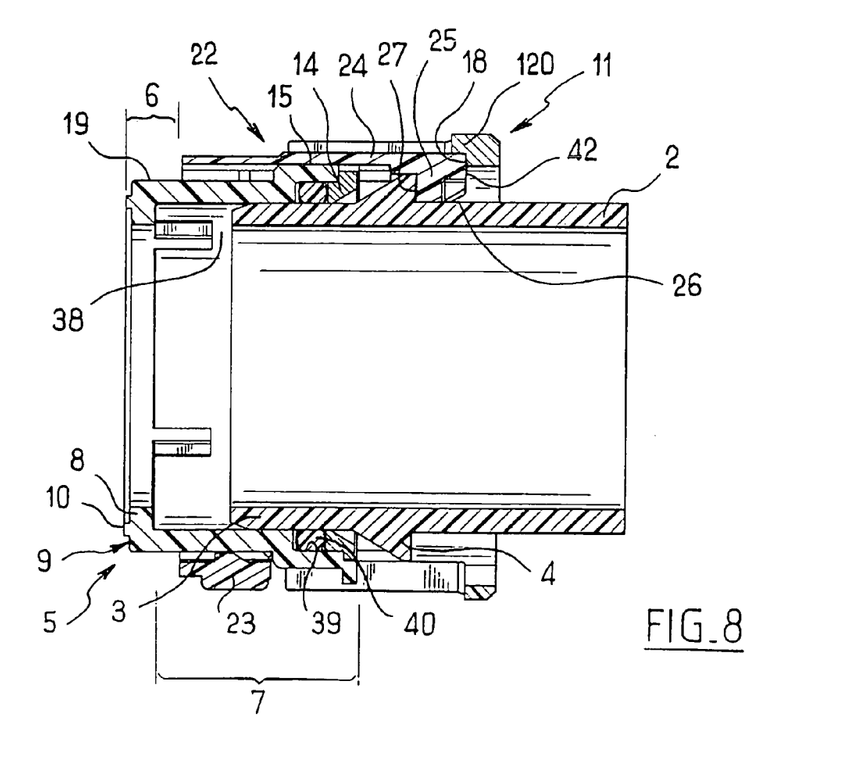
FIG. 8 is a view analogous to that of FIG. 7, when the circuit in which the coupling device in accordance with the second embodiment of the invention is included is under pressure.
Figure 9:
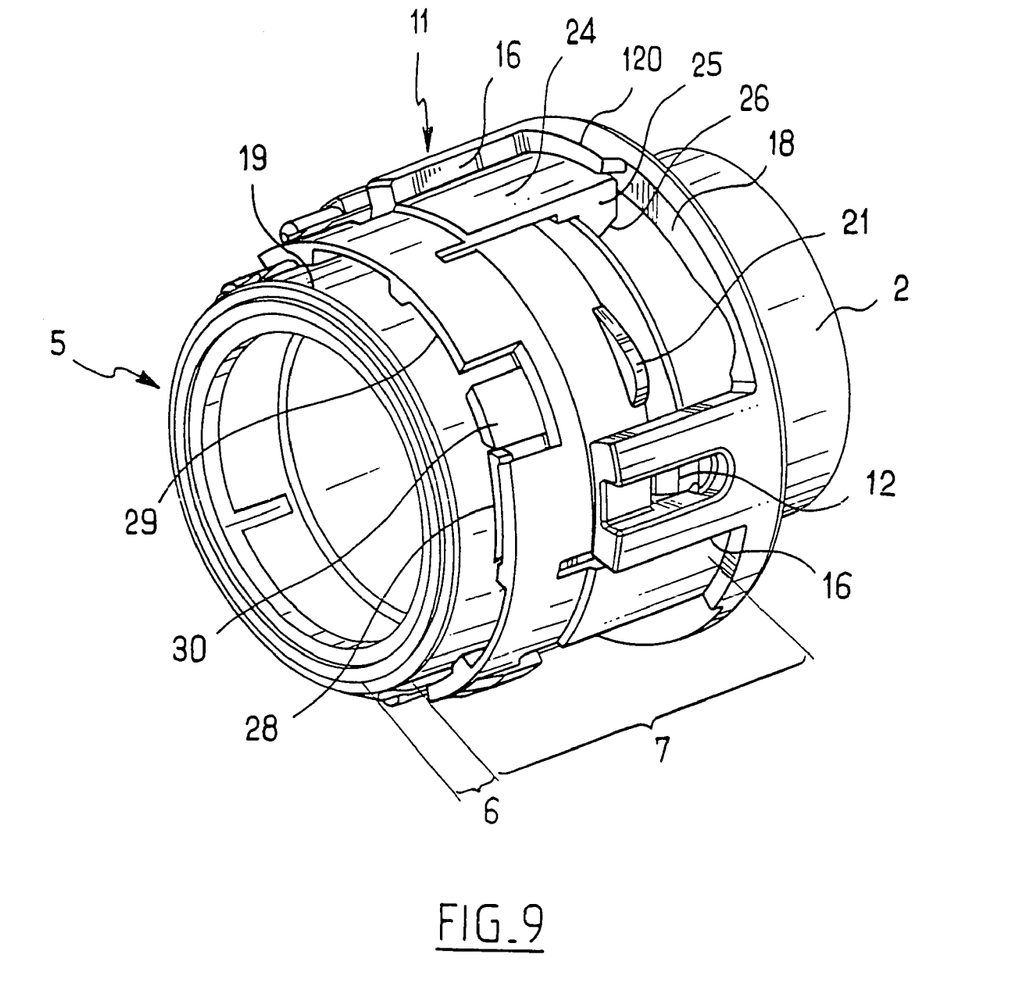
FIG. 9 is a perspective view of the coupling device.

When the circuit is put under pressure, the duct 2 reverses and entrains the retaining member into its locking position, bringing the free ends 25 of the tabs 24 under the flaps 120 so that they oppose any deformation of the tabs 24 towards their release state (see FIG. 8).

It should be observed that in this position, the front faces 42 of the tabs 24 come into contact with the transverse edges 18 that take up the traction force.

Disconnection is implemented by turning the retaining member 22 towards its unlocking position. While the member is turning, the tabs 24 slide onto the ramps 21, thereby lifting the tabs 24 and deforming them into their release state. The duct 2 can then be extracted from the coupling device.

Naturally, the invention is not limited to the embodiments described and variant embodiments can be applied thereto without going beyond the ambit of the invention as defined by the claims.

In particular, the retaining member may be of a structure that is different from that described and may have, for example, some other number of elastically deformable tabs.

Furthermore, the retaining member may have only two positions, e.g. the locking position and the free deformation position or the unlocking position and the free deformation position. When the retaining member possesses three positions, the order of the positions could be modified compared with that described and, for example, the locking position could be between the free deformation position and the unlocking position.

In addition, the indexing means of the retaining means could be of a structure that is different from that described: the stud could thus be secured to the sleeve while the housing and the spring blades could be formed in the body.

In a variant, the surfaces 27 of the tabs 24 could be inclined in such a manner that when the retaining member 22 is in the free deformation position and the circuit is put under pressure after the duct 2 has been inserted, the duct 2 reverses, thereby lifting the tabs 24 by a cam effect. Ejection of the duct indicates that the retaining means has not been put into its locking position.

The invention claimed is:

1. A quick coupling device, comprising:
   a tubular body having a connection section arranged to receive in a leaktight manner one end of a duct; and
   a retaining member mounted on the body and possessing tabs that are elastically deformable between a first state of gripping an outer bead on the end of the duct, and a second state of releasing the bead,
   wherein the retaining member is mounted on the body to turn around a central axis of the body between a free deformation position in which the tabs can deform between the first and second states, and at least one holding position in which the tabs cooperate with a surface that is secured to the body and that holds the tabs in one of the first and second states,
   wherein, in the holding position, each tab is in its gripping state and is received at least in part in a housing of the body having a surface that opposes deformation of the tab towards its release state, and
   wherein, in the holding position, each tab cooperates with a ramp of the body lifting the tab so as to bring it into its release state, wherein the retaining member possesses two holding positions that are angularly offset relative to each other.

2. The device according to claim 1, wherein the two holding positions are situated on either side of the free deformation position.

3. The device according to claim 1, wherein, in the free deformation position, the retaining member is arranged to be capable of being driven axially by the duct towards a locking position in which each tab in its gripping state is received at least in part in a housing of the body having a surface that opposes deformation of the tab towards its release state.

4. The device according to claim 1, wherein the body has a radial abutment surface for cooperating with a front radial surface at the free end of each tab when the tabs are subjected to a traction force.

5. The device according to claim 1, including indexing means for indexing the retaining member relative to the body at least for the free deformation position of the retaining member.

6. The device according to claim 5, wherein the indexing means comprises at least one flexible blade extending axially from the retaining member or the body to cooperate with a stud projecting radially from the body or from the retaining member.

7. The device according to claim 1, wherein the connection section has a cylindrical housing of a diameter slightly greater than an outside diameter of the end of the duct.

8. A quick coupling device, comprising:
a tubular body having a connection section arranged to receive in a leaktight manner one end of a duct; and
a retaining member mounted on the body and possessing tabs that are elastically deformable between a first state of gripping an outer bead on the end of the duct, and a second state of releasing the bead,
wherein the retaining member is mounted on the body to turn around a central axis of the body between a free deformation position in which the tabs can deform between the first and second states, and at least one holding position in which the tabs cooperate with a surface that is secured to the body and that holds the tabs in one of the first and second states,
and wherein the device further includes a link section remote from the connection section, and the connection section is surmounted by a rim that extends beyond the connection section away from the link section.

9. The device according to claim 8, wherein the rim is integral with the connection section and possesses an inside diameter of a portion projecting from the connection that is greater than an outside diameter of the outer bead.

10. The device according to claim 8, wherein the rim has a plurality of tongues, the tongues extending axially and each tongue possessing a free end provided with a catch projecting toward an inside of the rim.

11. The device according to claim 10, wherein each catch has an inclined facet on one side, and a radial facet on an opposite side.

12. The device according to claim 8, wherein a plurality of setbacks are formed at an outside of the rim at 120° intervals from one another.

13. The device according to claim 12, wherein each setback is defined by pairs of lateral edges extending parallel to the axis, and by a transverse edge extending perpendicular to the axis.

14. The device according to claim 12, wherein each setback opens out remote from the transverse edge.

15. A quick coupling device, comprising:
a tubular body having a connection section arranged to receive in a leaktight manner one end of a duct; and
a retaining member mounted on the body and possessing tabs that are elastically deformable between a first state of gripping an outer bead on the end of the duct, and a second state of releasing the bead,
wherein the retaining member is mounted on the body to turn around a central axis of the body between a free deformation position in which the tabs can deform between the first and second states, and at least one holding position in which the tabs cooperate with a surface that is secured to the body and that holds the tabs in one of the first and second states,
and wherein the device further includes a link section remote from the connection section, and the link section has an end face having an axially extending collar.

* * * * *